United States Patent
Fujioka et al.

(10) Patent No.: US 7,250,123 B2
(45) Date of Patent: Jul. 31, 2007

(54) COMPOSITE CONSTRUCTION AND MANUFACTURING METHOD THEREOF

(75) Inventors: Hiromi Fujioka, Kagoshima (JP); Daisuke Shibata, Kagoshima (JP); Tatsuyuki Nakaoka, Kagoshima (JP)

(73) Assignee: Kyocera Corporation, Kyoto (JP)

( * ) Notice: Subject to any disclaimer, the term of this patent is extended or adjusted under 35 U.S.C. 154(b) by 149 days.

(21) Appl. No.: 11/070,503

(22) Filed: Mar. 1, 2005

(65) Prior Publication Data
US 2005/0147851 A1 Jul. 7, 2005

Related U.S. Application Data (62) Division of application No. 10/389,263, filed on Mar. 14, 2003, now Pat. No. 6,878,434.

(30) Foreign Application Priority Data

| Mar. 15, 2002 | (JP) | 2002-073061 |
| Jul. 26, 2002 | (JP) | 2002-218945 |

(51) Int. Cl.
*B29C 44/00* (2006.01)
(52) U.S. Cl. ..... 264/43; 264/45.1; 264/171.1; 264/171.11; 264/176.1; 264/603; 264/642
(58) Field of Classification Search ............ 264/43, 264/45.1, 171.1, 171.11, 176.1, 914, 603, 264/642
See application file for complete search history.

(56) References Cited

U.S. PATENT DOCUMENTS

| 4,265,662 | A | * | 5/1981 | Miyake et al. ............ 75/238 |
| 4,770,935 | A | | 9/1988 | Yamamura et al. ......... 428/375 |
| 5,462,813 | A | * | 10/1995 | Nagano et al. ............. 428/698 |
| 5,645,781 | A | | 7/1997 | Popovic |
| 6,063,502 | A | | 5/2000 | Sue et al. .................... 428/469 |
| 6,607,835 | B2 | | 8/2003 | Fang et al. .................. 428/698 |

(Continued)

FOREIGN PATENT DOCUMENTS

DE 28 56 513 7/1979

(Continued)

*Primary Examiner*—Archene Turner
(74) *Attorney, Agent, or Firm*—Hogan & Hartson LLP (57) ABSTRACT

A composite construction 1 is obtained by coating the outer periphery of a core material 2 with a shell layer 3. The core material 2 is composed of a first sintered body that is obtained by bonding, with a binder metal, a first hard particle composed of one or more of carbides, nitrides and carbonitrides of metals of Groups 4a, 5a and 6a of the Periodic Table, or a first ceramics obtained by bonding, with a sintering additive, a first ceramic particle composed of at least one of oxides, carbides, nitrides and carbonitrides selected from the group consisting of metals of Groups 4a, 5a and 6a of the Periodic Table, Al, Si and Zn. The shell layer 3 is composed of a second hard sintered body or second ceramics having a different composition from the first hard sintered body. The ratio of the residual free carbon amount $C_{in}$ in the core material 2 to the residual free carbon amount $C_{out}$ in the shell layer 3, $C_{in}/C_{out}$, is 0.5 to 2. This prevents shrinkage during the time of sintering and also prevents the strength of the composite construction from lowering due to poor sintering.

16 Claims, 2 Drawing Sheets

U.S. PATENT DOCUMENTS 6,998,173 B2 * 2/2006 Liu et al. .................. 428/312.2

FOREIGN PATENT DOCUMENTS

| DE | 692 23 528 | 1/1998 |
| JP | 08-92607 | 4/1996 |
| JP | 08-092607 | * 4/1996 |
| JP | 08-120308 | 5/1996 |
| JP | 2000-144201 | * 5/2000 |
| WO | 01/73146 | 10/2001 |

* cited by examiner

COMPOSITE CONSTRUCTION AND MANUFACTURING METHOD THEREOF

DESCRIPTION

This is a divisional of application Ser. No. 10/389,263 filed Mar. 14, 2003 now U.S. Pat. No. 6,878,434 which application is hereby incorporated by reference in its entirety.

FIELD OF THE INVENTION

The present invention relates to a composite construction obtained by coating the outer periphery of a core material with a shell layer having a different composition from the core material, as well as a method of manufacturing the same.

BACKGROUND OF THE INVENTION

Conventionally, there has been studied a technique of improving the toughness of a construction in addition to its hardness and strength by coating the outer periphery of a continuous core material, such as fabrics, with other material. For example, U.S. Pat. No. 5,645,781 describes that a composite construction excellent in toughness indicating non-brittle fracture characteristic is obtainable by stretching by co-extrusion a laminated molding in which the outer periphery of a cylindrical core material molding composed of a first ceramic powder containing a large amount of organic binder (thermoplastic polymer) is surrounded by a shell layer molding consisting of a second ceramic powder different from the ceramic powder of the core material and an organic binder, and then sintering the stretched molding.

However, in the composite construction obtained by the method disclosed in U.S. Pat. No. 5,645,781, it is necessary to add a large amount of organic binder in order to perform co-extrusion molding. Therefore, during the time of sintering, a large amount of the organic binder are decomposed and volatilized, thereby forming voids. A large burning shrinkage occurs when these voids are eliminated for densifying the construction during the time of sintering. As the result, in the composite construction obtained by sintering, a large residual stress occurs between the core material and shell layer. In some cases, delamination between the two is facilitated and the strength of the composite construction decreases.

Further, with the above method, it is necessary to decompose and volatilize a large amount of the organic binder. In practice, binder burnout treatment has a limitation. Particularly, when there is a large amount of the organic binder remaining without being decomposed and volatilized, i.e., residual free carbon, in the core material located at the inside of the composite construction, the core material suffers from poor sintering and its sintered density does not increase, thus deteriorating the strength of the composite construction.

SUMMARY OF THE INVENTION

It is a main object of the present invention to provide a composite construction exhibiting excellent strength, hardness and toughness even when molding and sintering are performed by adding in particular a large amount of organic binder, as well as a method of manufacturing the same.

It is another object of the present invention to provide a composite construction capable of efficiently performing binder burnout treatment even when molding and sintering are performed by adding a large amount of organic binder, as well as a method of manufacturing the same.

The present inventors considered the above problem and found the followings. In the case of reducing the amount of excess residual free carbon remaining in a core material, it is possible to reduce the amount of shrinkage occurred when sintering the core material and reduce the residual stress between the core material and shell layer. This eliminates delamination and residual stress occurred between the core material and shell layer, thereby providing a composite construction excellent in hardness, toughness and strength.

In the present invention, a first method for reducing the amount of carbon remaining in a core material is that the same metal powder as a metal composition of a first hard particle or first ceramic particle is added to the raw material of the core material, and during the time of sintering, the metal powder is allowed to react with the residual free carbon remaining as a residue of an organic binder, in order to generate a metal carbide.

A second method for reducing the amount of carbon remaining in a core material is that an oxide powder that changes to a hard particle or ceramic particle of carbide, nitride or carbonitride is added to the raw material of the core material, and during the time of sintering or before sintering, the oxide powder is subjected to carbonization or subjected to carbonization and nitriding in order to release oxygen, and then allowed to react with the residual free carbon remaining as a residue of an organic binder. A third method for reducing the amount of carbon remaining in a core material is that an iron family metal oxide powder is added to the raw material of the core material, and during the time of sintering or before sintering, the iron family metal oxide powder is subjected to reduction in order to release oxygen, and then allowed to react with the residual free carbon remaining as a residue of an organic binder. A composite construction excellent in hardness and toughness and also excellent in strength is obtainable because the oxide powder can be changed to a carbide, nitride, or carbonitride, each having a higher hardness.

The composite construction of the present invention obtained based on the above-mentioned first method includes a continuous core material composed of a first hard sintered body or first ceramics, and a shell layer that coats the outer periphery of the core material and is composed of a second hard sintered body or second ceramics having a different composition from the first hard sintered body and first ceramics. The ratio of the residual free carbon amount $C_{in}$ in the core material to the residual free carbon amount $C_{out}$ in the shell layer, $C_{in}/C_{out}$, is 0.5 to 2. Here, the first hard sintered body is obtained by bonding, with a binder metal, a first hard particle composed of at least one selected from carbides, nitrides, and carbonitrides of metals of Groups 4a, 5a and 6a of the Periodic Table. The first ceramics is obtained by sintering, with a sintering additive, a first ceramic particle composed of at least one of oxides, carbides, nitrides, carbonitrides and borides selected from the group consisting of metals of Groups 4a, 5a and 6a of the Periodic Table, Al, Si and Zn.

The residual free carbon amount $C_{in}$ in the core material is preferably not more than 1% by weight. It is desirable that the same metal as the metal composition constituting the first hard particle or first ceramic particle is present in the core material. It is also desirable that the tensile stress on the core material surface is not more than 200 MPa. In an alternative, a plurality of the above-mentioned composite constructions may be bound to obtain a construction having a multi-filament structure.

The composite construction of the present invention obtained based on the above-mentioned second method includes (i) a continuous core material composed of a first hard sintered body obtained by bonding, with a binder metal, a first hard particle composed of at least one of carbides, nitrides and carbonitrides, which are obtained by performing carbonization and/or nitriding of at least one oxide selected from the group consisting of metals of Groups 4a, 5a and 6a of the Periodic Table, Si, Zn and Sn, or a first ceramics obtained by boding, with a sintering additive a first ceramic particle composed of at least one of carbides, nitrides and carbonitrides, which are obtained by performing carbonization and/or nitriding of at least one oxide selected from the group consisting of metals of Groups 4a, 5a and 6a of the Periodic Table, Al, Si and Zn, and (ii) a shell layer that coats the outer periphery of the core material and is composed of a second hard sintered body or second ceramics that has a different composition from the first hard sintered body.

Alternatively, the composite construction of the present invention based on the above-mentioned second method includes (i) a continuous core material composed of a first hard sintered body obtained by bonding, with a binder metal, a hard particle in which at least one oxide selected from the group consisting of metals of Groups 4a, 5a and 6a of the Periodic Table, Si, Zn and Sn, is mingled with at least one of carbides, nitrides and carbonitrides, or a first ceramics obtained by boding, with a sintering additive, a first ceramic particle in which at least one oxide selected from the group consisting of metals of Groups 4a, 5a and 6a of the Periodic Table, Al, Si and Zn, is mingled with at least one of carbides, nitrides, carbonitrides and borides, and (ii) a shell layer that coats the outer periphery of the core material and is composed of a second hard sintered body or second ceramics that has a different composition from the first hard sintered body.

The composite construction of the present invention based on the above-mentioned third method includes (i) a continuous core material composed of a first hard sintered body obtained by bonding, with a binder metal composed of an iron family metal obtained by reducing an oxide, a first hard particle composed of at least one of carbides, nitrides and carbonitrides of at least one selected from the group consisting of metals of Groups 4a, 5a and 6a of the Periodic Table, Si, Zn and Sn, or a first ceramics obtained by boding, with a sintering additive containing an iron family metal obtained by reducing an oxide, a first ceramic particle composed of at least one of oxides, carbides, nitrides and carbonitrides of at least one selected from the group consisting of metals of Groups 4a, 5a and 6a of the Periodic Table, Al, Si and Zn, and (ii) a shell layer that coats the outer periphery of the core material and is composed of a second hard sintered body or second ceramics that has a different composition from the first hard sintered body.

Alternatively, the composite construction of the present invention based on the above-mentioned third method includes (i) a continuous core material composed of a first hard sintered body obtained by bonding, with a binder metal composed of an iron family metal having an oxygen content concentration of 50 to 1000 ppm, a hard particle composed of at least one of carbides, nitrides and carbonitrides of at least one selected from the group consisting of metals of Groups 4a, 5a and 6a of the Periodic Table, Si, Zn and Sn, or a first ceramics obtained by boding, with a sintering additive containing an iron family metal having an oxygen content concentration of 50 to 1000 ppm, a first ceramic particle composed of at least one of oxides, carbides, nitrides, carbonitrides and borides of at least one selected from the group consisting of metals of Groups 4a, 5a and 6a of the Periodic Table, Al, Si and Zn, and (ii) a shell layer that coats the outer periphery of the core material and is composed of a second hard sintered body or second ceramics that has a different composition from the first hard sintered body.

In either case, it is desirable that in other composite constructions of the present invention, the ratio of the residual free carbon amount $C_{in}$ in the core material to the residual free carbon amount $C_{out}$ in the shell layer, $C_{in}/C_{out}$, is 0.5 to 2, as previously described. It is also desirable that the porosity in the core material of these composite constructions is not more than A04.

A method of manufacturing a composite construction according to the present invention includes the steps of: (a) forming a core material molding by mixing a mixture of a metal powder that is a metal composition constituting a first hard particle composed of at least one of carbides, nitrides and carbonitrides of metals of Groups 4a, 5a and 6a of the Periodic Table, a binder metal powder, and an organic binder, or a mixture of a metal powder that is a metal composition constituting a first ceramic particle composed of at least one of carbides, nitrides and carbonitrides selected from the group consisting of metals of Groups 4a, 5a and 6a of the Periodic Table, Al, Si and Zn, a sintering additive powder, and an organic binder, and then molding the mixture in a continuous shape; (b) forming a composite molding by forming a shell layer molding having a different composition from the molding obtained in the step (a), and then disposing the shell layer molding so as to coat the outer periphery of the core material obtained in the step (a); and (c) sintering the composite molding such that the metal powder of the metal composition constituting the first hard particle or the first ceramic particle is made into ceramic and its volume is expanded.

Other method of manufacturing a composite construction according to the present invention includes the steps of: (a) forming a core material molding by mixing a mixture of at least one powder selected from the group consisting of oxides of metals of Groups 4a, 5a and 6a of the Periodic Table, $SiO_2$, ZnO and $SnO_2$, a binder metal powder, and an organic binder, or a mixture of at least one powder selected from the group consisting of oxides of metals of Groups 4a, 5a and 6a of the Periodic Table, $SiO_2$, ZnO and $SnO_2$, a sintering additive powder, and an organic binder, then molding the mixture in a continuous shape; (b) forming a composite molding by forming a shell layer molding having a different composition from the molding obtained in the step (a), and disposing the shell layer molding so as to coat the outer periphery of the core material molding obtained in the step (a); and (c) sintering the composite molding. This method is characterized in that at least one powder selected from the group consisting of oxides of metals of Groups 4a, 5a and 6a of the Periodic Table, $SiO_2$, ZnO, and $SnO_2$ is subjected to carbonization or nitriding before sintering or during the time of sintering.

In the step (c) of the above other manufacturing method, a heat treatment is carried out at 1000 to 1500° C. for 0.5 to 5 hours in vaccum or inactive atmosphere such that at least one powder selected from the group consisting of oxides of metals of Groups 4a, 5a and 6a of the Periodic Table, $SiO_2$, ZnO and $SnO_2$ is subjected to carbonization or nitriding, followed by sintering at 1300 to 1900° C. for 0.5 to 5 hours in vaccum or inactive atmosphere. Further in the step (c), at least one powder selected from the group consisting of oxides of metals of Groups 4a, 5a and 6a of the Periodic Table, $SiO_2$, ZnO and $SnO_2$ is carbonized by reacting with the residual of the organic binder used in the step (a).

Still other method of manufacturing a composite construction according to the present invention includes the steps of: (a) forming a core material molding by mixing a mixture of at least one of carbide powder, nitride powder and carbonitride powder selected from the group consisting of metals of Groups 4a, 5a and 6a of the Periodic Table, Si, Zn and Sn, an iron family metal oxide powder, and an organic binder, or a mixture of at least one powder selected from the group consisting of oxides, carbides, nitrides and carbonitrides of at least one selected from the group consisting of metals of Groups 4a, 5a and 6a of the Periodic Table, Al, Si and Zn, a sintering additive powder containing an iron family metal oxide powder, and an organic binder, then molding the mixture in a continuous shape; (b) forming a composite molding by forming a shell layer molding having a different composition from the molding obtained in the step (a), and disposing the shell layer molding so as to coat the outer periphery of the core material molding obtained in the step (a); and (c) sintering the composite molding. The iron family metal oxide powder is subjected to reduction before sintering or during the time of sintering.

In both manufacturing methods, it is desirable to add a 30 to 70% by weight organic binder. In an alternative, the composite construction obtained in the step (b) may be stretched by co-extrusion. In other alternative, a plurality of the composite constructions stretched by co-extrusion may be bound and again subjected to co-extrusion, thereby manufacturing a composite construction of multi-filament structure.

DETAILED DESCRIPTION OF THE INVENTION

First Preferred Embodiment of the Invention

Figure 1:
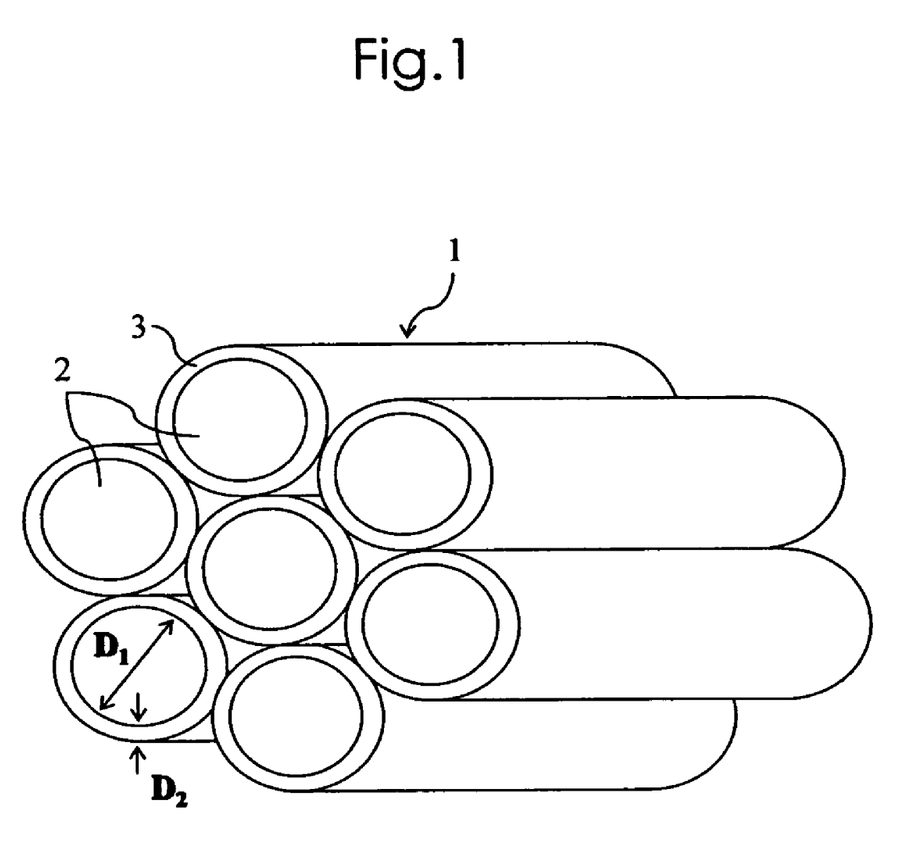
FIG. 1 is a schematic perspective view showing one example of a composite construction according to the present invention.

A first preferred embodiment of the invention will be described based on FIG. 1. As shown in FIG. 1, a composite construction 1 has such a structure that the outer periphery of a continuous core material 2 is coated with a shell layer 3.

As the material of a first hard sintered body constituting the core material 2, there is for example a hard particle composed of one or more of carbides, nitrides and carbonitrides of metals of Groups 4a, 5a and 6a of the Periodic Table, particularly at least one hard particle selected from the group consisting of WC, TiC; TiCN, TiN, TaC, NbC, ZrC, ZrN, VC, $Cr_3C_2$ and $MO_2C$, more preferably a hard particle containing WC, TiC or TiCN, as a main component. The first hard sintered body is obtained by bonding these materials with a binder metal composed of at least one selected from the group consisting of Fe, Co and Ni, particularly composed of Co and/or Ni. Particularly suitable first hard sintered body is a cemented carbide or cermet.

As the material of a first ceramics constituting the core material 2, besides the above-mentioned sintered body, there is for example at least one of oxides, carbides, nitrides and carbonitrides selected from the group consisting of metals of Groups 4a, 5a and 6a of the Periodic Table, Al, Si and Zn, preferably at least one selected from the group consisting of $Al_2O_3$—TiC (TiCN), SiC, $Si_3N_4$, $ZrO_2$, $TiB_2$ and ZnO—TiC, more preferably $Al_2O_3$—TiC (TICN) and/or SiC. It is possible to contain a suitable sintering additive composition into the first ceramics.

As the material of the shell layer 3 coating the outer periphery of the core material 2, there is used a second hard sintered body or second ceramics that has a different composition from the core material 2.

As the second hard sintered body or second ceramics, polycrystal diamond, DLC (diamond like carbon), and cBN can also be used, besides the above-mentioned materials used for the core material 2.

As a suitable combination of core material 2 (i.e., the first hard sintered body or first ceramics) and shell layer 3 (i.e., the second sintered body or second ceramics), there is for example one selected from the group consisting of a cemented carbide and cermet combination (referred to as "cemented carbide-cermet"), cemented carbide-cBN, cemented carbide-diamond sintered body, cemented carbide-alumina, cemented carbide-silicon nitride, cermet-cemented carbide, cermet-diamond sintered body, cermet-alumina, cermet-silicon nitride, (alumina, titanium carbonitride)-alumina, silicon carbide-silicon nitride, (silicon carbide, silicon nitride)-silicon nitride, and silicon carbide-diamond sintered body. Among these, one selected from the group consisting of cemented carbide-cermet, cemented carbide-diamond sintered body, and (alumina, titanium carbonitride)-alumina is most suitable in the point that it has a good balance of hardness and toughness and suitably used as a cutting tool.

The ratio of the residual free carbon amount $C_{in}$ in the core material 2 to the residual free carbon amount $C_{out}$ in the shell layer 3, $C_{in}/C_{out}$, is set to the range of 0.5 to 2. This prevents that the organic binder cannot completely be dissolved and volatized in the core material 2 located at the inside of the composite construction 1, and a large amount of residual free carbon remain and the core material 2 suffers from poor sintering. It is therefore possible to improve the strength of the composite construction 1. That is, when the ratio $C_{in}/C_{out}$ is smaller than 0.5, it is impossible to manufacture a uniformly continuous composite construction 1. On the other hand, when the ratio $C_{in}/C_{out}$ is over 2, the core material 2 suffers from poor sintering, which lowers the strength of the composite construction 1.

In order to densify the core material 2 and improve the strength of the composite construction 1, the residual free carbon amount $C_{in}$ in the core material 2 is not more than 1% by weight, preferably not more than 0.5% by weight, more preferably not more than 0.2% by weight. In other words, the porosity based on ANSI/ASTM B276-54 (ISO 4505 Cemented carbides-Metallographic determination of porosity and uncombined carbon) of the core material 2 and shell layer 3 in the composite construction 1 is respectively not more than A04 or B04, preferably not more than A02. The term "residual free carbon amount" used in the present invention indicates the ratio of the content of free carbon composition, except for the carbon composition that constitutes carbide or carbonitride by bonding with metal, to the total amount of the core material 2 (or shell layer 3).

In order to improve the thermal conductivity of the composite construction 1 and/or impart conductivity, it is desirable that the same metal as the metal composition constituting the first hard particle or first ceramic particle is present in the core material 2, preferably present as a metal particle. Further, the same metal particle as the metal composition constituting the first hard particle or first ceramic particle, or other metal particle can be dispersed and contained in the shell layer 3.

In order to improve the hardness and strength of the composite construction 1 and also optimize the content of a binder material (binder metal or sintering additive) in the core material 2 and shell layer 3, the average particle diameter of the first hard particle or first ceramic particle that constitutes the core material 2 is preferably 0.05 to 10 μm, particularly 0.1 to 3 μm. On the other hand, in order to improve the toughness of the composite construction 1, the average particle diameter of the second hard particle or second ceramic particle that constitutes the shell layer 3 is preferably 0.01 to 5 μm, particularly 0.01 to 2 μm.

To accomplish hardness and toughness compatibility in the composite construction 1, diameter $D_1$ of the core material 2 is 2 to 1000 μm, preferably 10 to 500 μm, more preferably 50 to 200 μm, and thickness $D_2$ of the shell layer 3 is 1 to 500 μm, preferably 2 to 100 μm, more preferably 10 to 50 μm.

Further, according to the present invention, with the above-mentioned configuration, the tensile stress present in the interface between the core material 2 and shell layer 3 can be lowered to not more than 200 MPa, particularly 153 MPa, thereby preventing delamination therebetween and deterioration of strength.

Furthermore, according to the present invention, a plurality of the composite constructions 1 in which the outer periphery of the core material 2 is coated with the shell layer 3 can be bound to obtain a multi-filament structure, as shown in FIG. 1, which further improves the toughness of the composite construction. Even when binding a plurality of the composite constructions 1, according to the present invention, the residual free carbon amount of the composite construction located in the vicinity of the center of the bundle can be well reduced without lowing the binder burnout characteristic of an organic binder, thus leading to a high-strength construction that is densified as a whole.

According to the present invention, when the diameter or thickness of the composite construction 1 or its bundle is 1 mm or more, particularly 5 mm or more, further 10 mm or more, and/or the continuous length is 10 mm or more, particularly 30 mm or more, further 50 mm or more, it is possible to efficiently reduce the residual free carbon amount of the core material of the composite construction located in the vicinity of the center of the construction, and also eliminate delamination between the core material 2 and shell layer 3.

Further in the present invention, a plurality of the above-mentioned continuous composite constructions can be arranged in parallel so as to obtain a sheet. Further, a plurality of such sheets can be laminated so that the adjacent continuous bodies of these sheets have a predetermined angle, such as 0°, 45°, or 90°.

Manufacturing Method

Figure 2:
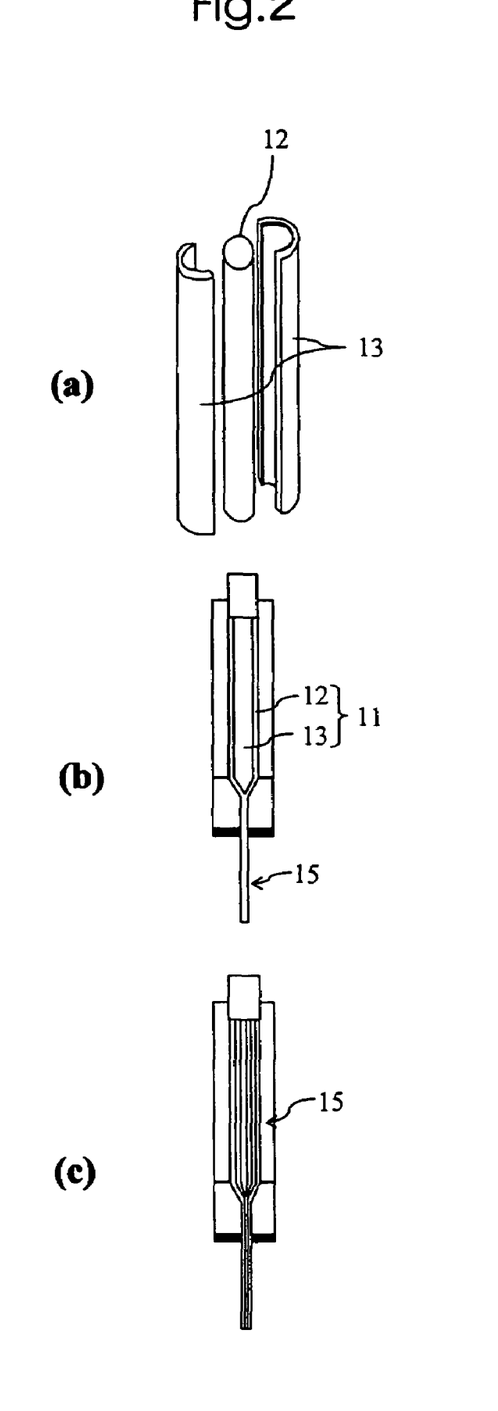
FIGS. 2(a), 2(b) and 2(c) are images showing the manufacturing steps of a composite construction according to the present invention.

A method of manufacturing a composite construction according to the present invention will be described based on schematic images in FIGS. 2(*a*), 2(*b*) and 2(*c*).

First, there is mixed (i) 0 to 80% by weight, preferably 20 to 70% by weight of a first hard particle that has an average particle diameter of 0.01 to 10 μm and is composed of one or more of carbides, nitrides and carbonitrides of metals of Groups 4*a*, 5*a* and 6*a* of the Periodic Table, or a first ceramic particle composed of at least one of oxides, carbides, nitrides and carbonitrides selected from the group consisting of metals of Groups 4*a*, 5*a* and 6*a* of the Periodic Table, Al, Si and Zn; and (ii) 3 to 80% by weight, preferably 5 to 50% by weight, more preferably 10 to 30% by weight of the same metal powder as a metal composition constituting the first hard particle or first ceramic particle having an average particle diameter of 0.01 to 10 μm, and, if required, 5 to 20% by weight of iron family metal powder having an average particle diameter of 0.01 to 10 μm, or 1 to 20% by weight of a sintering additive composition powder. Subsequently, an organic binder such as paraffin wax, polystyrene, polyethylene, ethylene-ethyl acrylate, ethylene-vinyl acetate, polybutyl methacrylate, polyethylene glycol or dibutyl phthalate, a plasticizer and a solvent were added to the mixture and then kneaded. This kneaded mixture is then formed into a cylindrical shape by a molding method such as pressing or casting, thereby obtaining a core material molding 12 (see FIG. 2(*a*)).

Here, in order to obtain a uniform composite molding by co-extrusion to be described later, the content of the above organic binder is 30 to 70% by volume, preferably 40 to 60% by volume.

On the other hand, a mixture constituting the shell layer 3 having a different composition from the above-mentioned core material molding 12 is kneaded together with the above-mentioned binder. By a molding method such as pressing, extrusion or casting, this kneaded mixture is made into two shell layer moldings 13 having a half-cut cylindrical shape. These shell layer moldings 13 are disposed so as to coat the outer periphery of the core material molding 12, thereby obtaining a molding 11 (see FIG. 2(*a*)).

Subsequently, the molding 11 is extruded (that is, the core molding 12 and shell layer moldings 13 are co-extruded). This produces a composite molding 15 stretched to a small diameter, in which the shell layer moldings 13 surrounds the core material molding 12 (see FIG. 2(*b*)). A construction of multi-filament structure is obtainable by binding a plurality of the extruded continuous composite moldings 15 and performing co-extrusion again (see FIG. 2(*c*)).

Further, if required, this stretched continuous composite molding 15 can be co-extruded again so as to obtain a continuous shape having a circular, triangular or rectangular cross-section. In an alternative, the continuous composite moldings 15 are aligned to obtain a sheet, and a plurality of such sheets are prepared. These sheets are made into a laminated body in which the continuous composite moldings 15 are laminated such that they are arranged in parallel, intersect perpendicularly, or have a predetermined angle, e.g., 45°. In other alternative, the continuous composite molding 15 can be formed in an arbitrary shape, such as in a sheet, by a known molding method such as rapid prototyping method. In still other alternative, a sheet obtained by aligning the composite moldings 15 as described above, or a composite construction sheet obtained by slicing the former sheet in a cross-sectional direction can be laminated on or bonded to the surface of a conventional sintered body (bulk body) of cemented carbide.

The obtained composite molding 15 is subjected to binder burnout treatment in which the temperature is heated to or maintained at 300 to 700° C. for 10 to 200 hours, followed by sintering in vaccum or inactive atmosphere at predetermined temperature and time, thereby obtaining a composite construction of the present invention.

According to the present invention, carbide is formed by the reaction of the same metal powder as the metal composition of the first hard particle or first ceramic particle added in the core material 2, with the residual free carbon remaining as a residue of the organic binder during the time of sintering. This enables to be oxidized excess residual free carbon. This also suppresses shrinkage accompanied by sintering to the core material, so that the residual stress between the core material and shell layer is reduced and delamination therebetween is prevented.

In the present invention, it is desirable that the temperature heating rate in the range of 800° C. or higher is controlled at or below 3° C./min because it is necessary to form carbide by allowing the metal powder in the raw material to react with the residual free carbon after binder burnout treatment. It is also desirable to control the temperature cooling rate at or below 3° C./min, in order to decrease the residual stress between the core material 2 and shell layer 3.

In addition, according to the present invention, the volume of part of metal powder can be expanded by oxidation, boriding, or nitriding.

Second Preferred Embodiment of the Invention

A second preferred embodiment will be described based on FIG. 1. In this preferred embodiment, as the material constituting a core material 2, there is used, for example, a first hard particle composed of one or more of carbides, nitrides and carbonitrides of metals of Groups 4a, 5a and 6a of the Periodic Table, Si, Zn and Sn, particularly at least one selected from the group consisting of WC, TiC, TiCN, TiN, TaC, NbC, ZrC, ZrN, VC, $Cr_3C_2$ and $Mo_2C$, more preferably a first hard particle containing WC, TiC or TiCN as a main component, and a first hard sintered body, particularly cemented carbide or cermet, which is obtained by boding with a binder metal composed of at least one selected from the group consisting of Fe, Co and Ni, particularly Co and/or Ni.

In addition, as the material constituting the core material 2, a first ceramic particle similar to that in the foregoing preferred embodiment can be used suitably. It is possible to contain a suitable sintering additive composition into the first ceramics.

As the material of the shell layer 3 coating the outer periphery of the core material 2, there is used a second hard sintered body or second ceramics having a different composition from the core material 2.

As the second hard sintered body or second ceramics, it is possible to use polycrystal diamond, DLC (diamond like carbon), and cBN, besides the above-mentioned materials used for the core material 2.

Particularly suitable combination of core material 2 (i.e., the first hard sintered body or first ceramics) and shell layer 3 (i.e., the second sintered body or second ceramics) is for example one selected from the group consisting of a cemented carbide and cermet combination (referred to as "cemented carbide-cermet"), cemented carbide-cBN, cemented carbide-diamond sintered body, cemented carbide-alumina, cemented carbide-silicon nitride, cermet-cemented carbide, cermet-diamond sintered body, cermet-alumina, cermet-silicon nitride, (alumina, titanium carbonitride)-alumina, silicon carbide-silicon nitride, (silicon carbide, silicon nitride)-silicon nitride, silicon carbide-diamond sintered body, alumina-cermet, alumina-cemented carbide, (alumina, titanium carbonitride)-cemented carbide, (alumina, titanium carbonitride)-cermet, alumina-zirconia, (alumina, titanium carbonitride)-zirconia, (alumina, titanium carbonitride)-(alumina, zirconia), silicon nitride-alumina, silicon nitride-(rare earth oxide, alumina, silica), diamond sintered body-cBN, silicon nitride-cemented carbide, silicon nitride-cermet, diamond-(alumina, titanium carbonitride), cBN-(alumina, titanium carbonitride), (alumina, titanium carbonitride)-silicon carbide, and alumina-silicon carbide. Among these, one selected from the group consisting of cemented carbide-cermet, cemented carbide-diamond sintered body, and (alumina, titanium carbonitride)-alumina is most suitable in the point that it has a good balance of hardness and toughness and suitably used as a cutting tool.

Here, the first hard particle or first ceramic particle constituting the core material 2 is obtained by subjecting at least part of an oxide powder to carbonization and/or nitriding during the time of sintering or before sintering. This prevents that the organic binder cannot completely be dissolved and volatized in the core material 2 located at the inside of the composite construction 1, as the result, a large amount of residual free carbon remain and the core material 2 is poor sintering. It is therefore possible to improve the strength of the composite construction 1. It is desirable that the ratio of the residual free carbon amount $C_{in}$ in the core material 2 to the residual-free carbon amount $C_{out}$ in the shell layer 3, $C_{in}/C_{out}$, is 0.5 to 2.

In order to densify the core material 2 and improve the strength of the composite construction 1, the residual free carbon amount $C_{in}$ in the core material 2 is not more than 1% by weight, preferably not more than 0.5% by weight, more preferably not more than 0.2% by weight. In other words, the porosity based on ANSI/ASTM B276-54 (ISO 4505 Cemented carbides-Metallographic determination of porosity and uncombined carbon) of the core material 2 and shell layer 3 in the composite construction 1 is respectively not more than A04 or B04, preferably not more than A02.

In order that carbide, nitride, or carbonitride formed by reaction with a metal oxide of the composite construction 1 contributes to a particle-dispersion strengthened mechanism and improves the toughness of the construction, the core material 2 may contain an oxide of the same metal as the metal composition constituting the first hard particle or first ceramic particle. The shell layer 3 may contain the same metal oxide particle as the metal composition constituting the first hard particle or first ceramic particle, or other metal oxide particle.

The average particle diameter of the first hard particle or first ceramic particle constituting the core material 2, and the average particle diameter of the second hard particle or second ceramic particle constituting the shell layer 3 may be in the same range as in the foregoing preferred embodiment. Diameter $D_1$ of the core material 2 and thickness $D_2$ of the shell layer 3 may be in the same range as in the foregoing preferred embodiment.

Third Preferred Embodiment of the Invention

A third preferred embodiment will be described based on FIG. 1. In this preferred embodiment, as the material constituting a core material 2, there is used, for example, a first hard particle composed of one or more of carbides, nitrides and carbonitrides of metals of Groups 4a, 5a and 6a of the Periodic Table, Si, Zn and Sn, particularly at least one selected from the group consisting of WC, TiC, TiCN, TiN, TaC, NbC, ZrC, ZrN, VC, $Cr_3C_2$ and $Mo_2C$, more preferably a first hard particle containing WC, TiC or TiCN as a main component, and a first hard sintered body, particularly cemented carbide or cermet, which is obtained by boding with a binder metal composed of at least one selected from the group consisting of Fe, Co and Ni, particularly Co and/or Ni.

In addition, as the material constituting the core material 2, a first ceramic particle similar to that in the foregoing preferred embodiment can be used suitably. It is possible to contain suitably a sintering additive composition into the first ceramics.

As the material of the shell layer 3 coating the outer periphery of the core material 2, there is used a second hard sintered body or second ceramics having a different composition from the core material 2.

As the second hard sintered body or second ceramics, it is possible to use polycrystal diamond, DLC (diamond like carbon), and cBN, besides the above-mentioned materials used for the core material 2.

Particularly suitable combination of core material 2 (i.e., the first hard sintered body or first ceramics) and shell layer 3 (i.e., the second sintered body or second ceramics) is for example one selected from the group consisting of a cemented carbide and cermet combination (referred to as "cemented carbide-cermet"), cemented carbide-cBN, cemented carbide-diamond sintered body, cemented carbide-alumina, cemented carbide-silicon nitride, cermet-cemented carbide, cermet-diamond sintered body, cermet-alumina, cermet-silicon nitride, (alumina, titanium carbonitride)-alumina, silicon carbide-silicon nitride, (silicon carbide, silicon nitride)-silicon nitride, silicon carbide-diamond sintered body, alumina-cermet, alumina-cemented carbide, (alumina, titanium carbonitride)-cemented carbide, (alumina, titanium carbonitride)-cermet, alumina-zirconia, (alumina, titanium carbonitride)-zirconia, (alumina, titanium carbonitride)-(alumina, zirconia), silicon nitride-alumina, silicon nitride-(rare earth oxide, alumina, silica), diamond sintered body-cBN, silicon nitride-cemented carbide, silicon nitride-cermet, diamond-(alumina, titanium carbonitride), cBN-(alumina, titanium carbonitride), (alumina, titanium carbonitride)-silicon carbide, and alumina-silicon carbide. Among these, one selected from the group consisting of cemented carbide-cermet, cemented carbide-diamond sintered body, and (alumina, titanium carbonitride)-alumina is most suitable in the point that it has a good balance of hardness and toughness and suitably used as a cutting tool.

Here, the first hard particle or first ceramic particle constituting the core material 2 is obtained by adding an oxide powder of iron family metal constituting a binder phase or sintering additive and subjecting at least part of the oxide powder to reduction during the time of sintering or before sintering. This prevents that the organic binder cannot completely be dissolved and volatized in the core material 2 located at the inside of the composite construction 1, as the result, a large amount of residual free carbon remain and the core material 2 suffers from sintering. It is therefore possible to improve the strength of the composite construction 1. It is desirable that the ratio of the residual free carbon amount $C_{in}$ in the core material 2 to the residual free carbon amount $C_{out}$ in the shell layer 3, $C_{in}/C_{out}$, is 0.5 to 2.

In order to densify the core material 2 and improve the strength of the composite construction 1, the residual free carbon amount $C_{in}$ in the core material 2 is not more than 1% by weight, preferably not more than 0.5% by weight, more preferably not more than 0.2% by weight. In other words, the porosity based on ANSI/ASTM B276-54 (ISO 4505 Cemented carbides-Metallographic determination of porosity and uncombined carbon) of the core material 2 and shell layer 3 in the composite construction 1 is respectively not more than A04 or B04, preferably not more than A02.

In order that carbide, nitride, or carbonitride formed by reaction with a metal oxide of the composite construction 1 contributes to a particle-dispersion strengthened mechanism and improves the toughness of the construction, the core material 2 may contain an oxide of the same metal as the metal composition constituting the first hard particle or first ceramic particle. The shell layer 3 may contain the same metal oxide particle as the metal composition constituting the first hard particle or first ceramic particle, or other metal oxide particle.

The average particle diameter of the first hard particle or first ceramic particle constituting the core material 2, and the average particle diameter of the second hard particle or second ceramic particle constituting the shell layer 3 may be in the same range as in the foregoing preferred embodiment. Diameter $D_1$ of the core material 2 and thickness $D_2$ of the shell layer 3 may be in the same range as in the foregoing preferred embodiment.

Manufacturing Method

A method of manufacturing a composite construction according to the foregoing preferred embodiment will be described based on the schematic images in FIGS. 2(a), 2(b) and 2(c).

First, there is mixed (i) 0.01 to 50% by weight, preferably 0.1 to 20% by weight, more preferably 10 to 20% by weight of an oxide powder that has an average particle diameter of 0.01 to 10 µm and is composed of one selected from metals of Groups 4a, 5a and 6a of the Periodic Table, Si, Zn and Sn; and 30 to 80% by weight, preferably 50 to 70% by weight of a first hard particle that has an average particle diameter of 0.01 to 10 µm and is composed of one or more of carbides, nitrides and carbonitrides of metals Groups 4a, 5a and 6a of the Periodic Table, Si, Zn and Sn, or a first ceramic powder composed of at least one of oxides, carbides, nitrides and carbonitrides selected from the group consisting of metals of Groups 4a, 5a and 6a of the Periodic Table, Al, Si and Zn; and, if required, 30% or less, preferably 20% by weight or less of the same metal powder as the metal composition constituting the first hard particle or first ceramic particle, and, if required, 5 to 20% by weight of iron family metal powder having an average particle diameter of 0.01 to 10 µm, and 1 to 20% by weight of a sintering additive composition powder. Subsequently, an organic binder such as paraffin wax, polystyrene, polyethylene, ethylene-ethyl acrylate, ethylene-vinyl acetate, polybutyl methacrylate, polyethylene glycol or dibutyl phthalate, a plasticizer and a solvent are added to the mixture and then kneaded. This kneaded mixture is then formed into a cylindrical shape by a molding method such as pressing or casting, thereby obtaining a core material molding 12 (see FIG. 2(a)).

The same subsequent steps as in the foregoing preferred embodiment are performed to obtain a composite construction 15. This composite construction 15 is subjected to binder burnout treatment in which the temperature is heated to or maintained at 100 to 700° C. for 10 to 200 hours, followed by sintering in vaccum or inactive atmosphere at predetermined temperature and time, thereby obtaining a composite construction of the present invention.

According to the present invention, the same metal oxide powder as the metal composition of the first hard particle or first ceramic particle added in the core material 2 is subjected to carbonization or nitriding during the time of sintering, such that oxygen is released and, in particular, allowed to react with the residual free carbon remaining as a residue of the organic binder, thereby forming carbide. This enables to be oxidized excess residual free carbon. In addition, the metal oxide powder is changed to at least one selected from the group consisting of carbide, nitride and carbonitride that have high hardness and strength, thus leading to a sintered body excellent in hardness, toughness and strength.

In the case of adding an iron family metal oxide powder, the iron family metal oxide is reduced to an iron family metal. In this reduction, oxygen is released and, in particular, allowed to react with the residual free carbon remaining as a residue of the organic binder, thereby forming carbide. This enables to be oxidized excess residual free carbon. In addition, the iron family metal acts as a binder phase or sintering additive thus leading to a sintered body excellent in hardness, toughness and strength.

It is also possible to control the oxygen content concentration in the binder phase or intergranular phase (sintering additive phase), depending on the amount of the iron family metal oxide powder and manufacturing conditions.

Because it is necessary to form carbide by allowing the metal powder in the raw material to react with the residual free carbon generated by binder burnout treatment, it is desirable to perform a heat treatment in vaccum or inactive gas atmosphere at 1000 to 1500° C., particularly 1150 to 1400° C., for 0.5 to 5 hours, particularly 1 to 3 hours. It is also desirable that the temperature heating rate in the range of 800° C. or higher is controlled at or below 3° C./min. It is desirable to carry out sintering in vaccum or inactive atmosphere at 1300 to 1900° C., particularly 1400 to 1800° C., for 0.5 to 5 hours, particularly 1 to 5 hours. It is also desirable to control the temperature cooling rate at or below 3° C./min, in order to decrease the residual stress between the core material 2 and shell layer 3.

In addition, according to the present invention, it is possible that a metal powder is added together with an oxide, and the volume of the metal powder is partly expanded by oxidation, boriding, or nitriding. Otherwise, this preferred embodiment is the same as the foregoing preferred embodiment, and therefore, its description is omitted.

EXAMPLES

Example 1

To a mixture of 75% by weight of WC powder having an average particle diameter of 1.5 μm, 10% by weight of Co powder having an average particle diameter of 1 μm, 5% by weight of TiC powder having an average particle diameter of 2 μm, and 10% by weight of metal W powder having an average particle diameter of 1 μm, cellulose and polystyrene glycol as organic binder, and polyvinyl alcohol as solvent were added in the total amount of 100 parts by volume. This mixture was then kneaded and extruded in a cylindrical shape, thereby obtaining a core material molding.

On the other hand, to a mixture of 50% by weight of TiCN powder having an average particle diameter of 1.5 μm, 10% by weight of TiC powder having an average particle diameter of 1.5 μm, 7% by weight of Co powder having an average particle diameter of 1 μm, 20% by weight of WC powder having an average particle diameter of 1.5 μm, 7% by weight of Mo$_2$C powder having an average particle diameter of 2 μm, and 6% by weight of VC powder having an average particle diameter of 2 μm, the same organic binders and solvent as mentioned above were added. This mixture was then kneaded and extruded to obtain two shell layer moldings having a half-cut cylindrical shape. The two shell layer moldings were disposed so as to coat the outer periphery of the core material molding, thereby obtaining a molding.

Subsequently; this molding was co-extruded to obtain a stretched composite construction, and 100 pieces of the stretched composite constructions were bound and co-extruded again, thereby obtaining a composite molding of multi-filament type.

Then, this multi-filament type composite molding was cut off into 100 mm length and aligned in parallel to obtain a sheet. These six sheets were laminated such that the composite constructions in the adjacent sheets have an angle of 45°, thereby obtaining a rectangular parallelepiped laminated molding.

Thereafter, this laminated molding was subjected to binder burnout treatment by raising the temperature from 300 to 700° C. in 100 hours. Subsequently, the temperature was raised at a temperature heating rate of 2.5° C./min, sintering was performed in vaccum at 1450° C. for 2 hours, and the temperature was then cooled at 3° C./min, thereby obtaining a composite construction.

In this composite construction, the residual free carbon amount $C_{in}$ in the core material and the residual free carbon amount $C_{out}$ in the shell layer were respectively measured based on JISH1402. As the result, the former was 0.3% by weight, the latter was 0.26% by weight, and the ratio $C_{in}/C_{out}$ was 1.2.

The cross-section of the composite construction was observed. The diameter of the core material was 90 μm and the thickness of the shell layer was 15 μm. Between the core material and shell layer, no delamination was observed. The residual stress in the interface between the core material and shell layer was measured by X-ray diffraction and it was found that tensile stress of 31 MPa was present. The three-point bending strength based on JISR1601 of the composite construction was 2000 MPa. The porosity based on ANSI/ASTM B276-54 (ISO 4505 Cemented carbides-Metallographic determination of porosity and uncombined carbon) of the shell layer was A00, and that of the core material was A01.

Comparative Example 1

A composite construction was manufactured in the same manner as Example 1, except that the material for core material was changed to a mixture of 85% by weight of WC powder having an average particle diameter of 1.5 μm, 10% by weight of Co powder having an average particle diameter of 1 μm, and 5% by weight of TiC powder having an average particle diameter of 2 μm. The same evaluation was conducted and the following results were obtained. The residual free carbon amount $C_{in}$ in the core material was 3.06% by weight, the residual free carbon amount $C_{out}$ in the shell layer was 0.62% by weight, and the ratio $C_{in}/C_{out}$ was 4.9. In the cross-section of the composite construction was observed, a large number of delaminations were observed in the interface between the core material and shell layer. By measuring the residual stress in the interface between the core material and shell layer, it was found that tensile stress of 255 MPa was present. The three-point bending strength of the composite construction was 500 MPa. The porosity of the shell layer was C01, and that of the core material was C06.

Example 2

A composite construction was manufactured in the same manner as Example 1, except that the material for shell layer in Example 1 was changed to a mixture of 80% by weight of WC powder having an average particle diameter of 0.2 μm, 8% by weight of Co powder having an average particle diameter of 0.5 μm, 0.3% by weight of VC powder having an average particle diameter of 0.8 µm, 0.7% by weight of $Cr_3C_2$ powder having an average particle diameter of 0.8 µm, and 11% by weight of metal W powder having an average particle diameter of 0.3 µm. The same evaluation was conducted and the following results were obtained. The residual free carbon amount $C_{in}$ in the core material was 0.38% by weight, the residual free carbon amount $C_{out}$ in the shell layer was 0.30% by weight, and the ratio $C_{in}/C_{out}$ was 1.3. By measuring the residual stress in the interface between the core material and shell layer by X-ray diffraction, it was found that tensile stress of 43 MPa was present. The three-point bending strength of the composite construction was 1800 MPa. The porosity of the shell layer was A01, and that of the core material was A02.

Example 3

A composite construction was manufactured in the same manner as Example 1, except that (i) the material for core material in Example 1 was changed to a mixture of 50% by weight of silicon carbide powder having an average particle diameter of 2 µm, 23% by weight of aluminum nitride powder having an average particle diameter of 2 µm, 17% by weight of alumina powder, and 10% by weight of metal silicon powder, (ii) the material for shell layer in Example 1 was changed to a mixture of 97% by weight of $Si_3N_4$ powder having an average particle diameter of 2 µm, 2% by weight of $Y_2O_3$ powder having an average particle diameter of 1.5 µm, and 1% by weight of $Al_2O_3$ powder having an average particle diameter of 1 µm, and (iii) the temperature at which the construction was sintered was changed to 1900° C. The same evaluation was conducted and the following results were obtained. The residual free carbon amount $C_{in}$ in the core material was 0.20% by weight, the residual free carbon amount $C_{out}$ in the shell layer was 0.21% by weight, and the ratio $C_{in}/C_{out}$ was 0.95. By measuring the residual stress in the interface between the core material and shell layer, it was found that tensile stress of 104 MPa was present. The three-point bending strength of the composite construction was 950 MPa. The porosity of the shell layer was A01, and that of the core material was A01.

Example 4

To a mixture of 80% by weight of WC powder having an average particle diameter of 1.5 µm, 10% by weight of Co powder having an average particle diameter of 1 µm, 5% by weight of TiC powder having an average particle diameter of 2 µm, and 5% by weight of $TiO_2$ powder having an average particle diameter of 1 µm, cellulose and polystyrene glycol as organic binder, and polyvinyl alcohol as solvent were added in the total amount of 100 parts by volume. This mixture was then kneaded and extruded in a cylindrical shape, thereby obtaining a core material molding.

On the other hand, to a mixture of 50% by weight of TiCN powder having an average particle diameter of 1.5 µm, 13% by weight of TiC powder having an average particle diameter of 1.5 µm, 7% by weight of Co powder having an average particle diameter of 1 µm, and 19% by weight of WC powder having an average particle diameter of 1.5 µm, 6% by weight of $Mo_2C$ powder having an average particle diameter of 2 µm, and 5% by weight of VC powder having an average particle diameter of 2 µm, the same organic binders and solvent as mentioned above were added. This mixture was then kneaded and extruded to obtain two, shell layer moldings having a half-cut cylindrical shape. The two shell layer moldings were disposed so as to coat the outer periphery of the core material molding, thereby obtaining a molding.

Subsequently, this molding was co-extruded to obtain a stretched composite construction, and 100 pieces of the stretched composite constructions were bound and co-extruded again, thereby obtaining a composite molding of multi-filament type.

Then, this multi-filament type composite molding was cut off into 100 mm length and aligned in parallel to obtain a sheet. These six sheets were laminated such that the composite constructions in the adjacent sheets have an angle of 45°, thereby obtaining a rectangular parallelepiped laminated molding.

Thereafter, this laminated molding was subjected to binder burnout treatment by raising the temperature from 100 to 700° C. in 100 hours. Subsequently, the temperature was raised at a temperature heating rate of 2.5° C./min, and maintained at 1300° C. for 1 hour in vaccum, followed by sintering at 1450° C. for 2 hours. Thereafter, the temperature was cooled at 3° C./min, thereby obtaining a composite construction.

Free carbon amount in the obtained composite construction as a whole was measured. The residual free carbon amount $C_{in}$ in the core material and the residual free carbon amount $C_{out}$ in the shell layer were measured, and the former was 0.01% by weight and the latter was 0.1% by weight.

The cross-section of the composite construction was observed. The diameter of the core material was 90 µm and the thickness of the shell layer was 5 µm. No delamination was observed between the core material and shell layer. The residual stress in the interface between the core material and shell layer was measured by X-ray diffraction, and it was found that compressive stress of 230 MPa was present in the core material 2. The three-point bending strength of the composite construction was 2500 MPa. The porosity of the shell layer was A02, and that of the core material was A01.

Comparative Example 2

A composite construction was manufactured in the same manner as Example 4, except that the material for core material in Example 1 was changed to a mixture of 85% by weight of WC powder having an average particle diameter of 1.5 µm, 10% by weight of Co powder having an average particle diameter of 1 µm, and 5% by weight of TiC powder having an average particle diameter of 2 µm. The same evaluation was conducted and the following results were obtained. The residual free carbon amount $C_{in}$ in the core material was 4.56% by weight, and the residual free carbon amount $C_{out}$ in the shell layer was 2.00% by weight. In the cross-section of the composite construction, a large number of delaminations were observed in the interface between the core material and shell layer. The three-point bending strength of the composite construction was 500 MPa. The porosity of the shell layer was C01, and that of the core material was C06.

Example 5

A composite construction was manufactured in the same manner as Example 1, except that the material for shell layer in Example 4 was changed to a mixture of 50% by weight of TiCN powder having an average particle diameter of 1.5 µm, 10% by weight of TiC powder having an average particle diameter of 1.5 µm, 7% by weight of Co powder having an average particle diameter of 1 µm, 19% by weight of WC powder having an average particle diameter of 1.5 μm, 6% by weight of Mo$_2$C powder having an average particle diameter of 2 μm, 5% by weight of VC powder having an average particle diameter of 2 μm, and 3% by weight of TiO$_2$ powder having an average particle diameter of 1.0 μm. The same evaluation was conducted and the following results were obtained.

The residual free carbon amount $C_{in}$ in the core material was 0.01% by weight, and the residual free carbon amount $C_{out}$ in the shell layer was 0.01% by weight. The residual stress in the interface between the core material and shell layer was measured by X-ray diffraction, and it was found that compressive stress of 200 MPa was present in the core material 2. The three-point bending strength of the composite construction was 2600 MPa. The porosity of the shell layer was A00, and that of the core material was A00.

Example 6

A laminated molding having a rectangular parallelepiped shape was manufactured in the same manner as Example 1, except that (i) the material for core material in Example 4 was changed to a mixture of 70% by weight of Al$_2$O$_3$ powder having an average particle diameter of 0.2 μm, 21% by weight of TiC powder having an average particle diameter of 0.5 μm, 5% by weight of TiNpowder having an average particle diameter of 0.5 μm, 0.5% by weight of Y$_2$O$_3$ having an average particle diameter of 1 μm, 0.5% by weight of MgO having an average particle diameter of 1 μm, 0.5% by weight of Co$_3$O$_4$ having an average particle diameter of 1 μm, and 2.5% by weight of TiO$_2$ having an average particle diameter of 1.5 μm, and (ii) the material for shell layer in Example 4 was changed to a mixture of 84% by weight of Al$_2$O$_3$ powder having an average particle diameter of 0.2 μm, 12% by weight of ZrO$_2$ powder having an average particle diameter of 0.5 μm, 0.5% by weight of Y$_2$O$_3$ having an average particle diameter of 1 μm, 0.5% by weight of MgO having an average particle diameter of 1 μm, 0.5% by weight of Co$_3$O$_4$ having an average particle diameter of 1 μm, and 2.5% by weight of TiO$_2$ powder having an average particle diameter of 1.5 μm.

Subsequently, this laminated molding was subjected to binder burnout treatment by raising the temperature from 100 to 700° C. in 100 hours. Then, the temperature was raised at a temperature heating rate of 2.5° C./min, and maintained at 1300° C. for 1 hour in vaccum, followed by sintering at 1600° C. for 2 hours. Thereafter, the temperature was cooled at 3° C./min, thereby obtaining a composite construction. The same evaluation as in Example 4 was conducted and the following results were obtained.

The residual free carbon amount $C_{in}$ in the core material was 0.015% by weight, and the residual free carbon amount $C_{out}$ in the shell layer was 0.012% by weight. By measuring the residual stress in the interface between the core material and shell layer, it was found that compressive stress of 250 MPa was present in the core material 2. The three-point bending strength of the composite construction was 950 MPa. The porosity of the shell layer was A01, and that of the core material was A01.

Example 7

A laminated molding having a rectangular parallelepiped shape was manufactured in the same manner as Example 1, except that (i) the material for core material in Example 4 was changed to a mixture of 92% by weight of Si$_3$N$_4$ powder having an average particle diameter of 0.2 μm, 6% by weight of Y$_2$O$_3$ powder having an average particle diameter of 0.5 μm, 1.5% by weight of Al$_2$O$_3$ powder having an average particle diameter of 0.5 μm, and 0.5% by weight of Si powder having an average particle diameter of 1 μm, and (ii) the material for shell layer in Example 4 was changed to a mixture of 90% by weight of SiC powder having an average particle diameter of 0.5 μm, 6% by weight of Al$_2$O$_3$ powder having an average particle diameter of 0.5 μm, 3.5% by weight of Y$_2$O$_3$ powder having an average particle diameter of 0.5 μm, and 0.5% by weight of SiO$_2$ powder having an average particle diameter of 1 μm.

Subsequently, this laminated molding was subjected to binder burnout treatment by raising the temperature from 100 to 700° C. in 100 hours. Then, the temperature was raised at a temperature heating rate of 2.5° C./min, and maintained at 1300° C. for 1 hour in vaccum, followed by sintering at 1900° C. for 2 hours. Thereafter, the temperature was cooled at 3° C./min, thereby obtaining a composite construction. The same evaluation as in Example 4 was conducted and the following results were obtained.

The residual free carbon amount $C_{in}$ in the core material was 0.01% by weight, and the residual free carbon amount $C_{out}$ in the shell layer was 0.012% by weight. By measuring the residual stress in the interface between the core material and shell layer, it was found that compressive stress of 200 MPa was present in the core material 2. The three-point bending strength of the composite construction was 950 MPa. The porosity of the shell layer was A01, and that of the core material was A01.

Example 8

A laminated molding having a rectangular parallelepiped shape was manufactured in the same manner as Example 1, except that (i) the material for core material in Example 4 was changed to a mixture of 67% by weight of Al$_2$O$_3$ powder having an average particle diameter of 0.2 μm, 21% by weight of TiC powder having an average particle diameter of 0.5 μm, 5% by weight of TiN powder having an average particle diameter of 0.5 μm, 0.5% by weight of Y$_2$O$_3$ powder having an average particle diameter of 1 μm, 0.5% by weight of MgO powder having an average particle diameter of 1 μm, 3.5% by weight of Co$_3$O$_4$ powder having an average particle diameter of 1 μm, and 2.5% by weight of TiO$_2$ powder having an average particle diameter of 1.5 μm, and (ii) the material for shell layer in Example 4 was changed to a mixture of 84% by weight of Al$_2$O$_3$ powder having an average particle diameter of 0.2 μm, 12% by weight of ZrO$_2$ powder having an average particle diameter of 0.5 μm, 0.5% by weight of Y$_2$O$_3$ powder having an average particle diameter of 1 μm, 0.5% by weight of MgO powder having an average particle diameter of 1 μm, 0.5% by weight of Co$_3$O$_4$ powder having an average particle diameter of 1 μm, and 2.5% by weight of TiO$_2$ powder having an average particle diameter of 1.5 μm.

Subsequently, this laminated molding was subjected to binder burnout treatment by raising the temperature from 100 to 700° C. in 100 hours. Then, the temperature was raised at a temperature heating rate of 2.5° C./min, and maintained at 1300° C. for 1 hour in vaccum, followed by sintering at 1600° C. for 2 hours. Thereafter, the temperature was cooled at 3° C./min, thereby obtaining a composite construction. The same evaluation as in Example 4 was conducted and the following results were obtained.

The residual free carbon amount $C_{in}$ in the core material was 0.016% by weight, and the residual free carbon amount $C_{out}$ in the shell layer was 0.013% by weight. By measuring the residual stress in the interface between the core material and shell layer, it was found that compressive stress of 260 MPa was present in the core material 2. The three-point bending strength of the composite construction was 930 MPa. The porosity of the shell layer was A01, and that of the core material was A01. Further, the oxygen content in the intergranular phase part was measured by energy dispersive spectroscopy (EDS) attached to transmission electron microscope (TEM), and its result was 90 ppm.

What is claimed is:

1. A method of manufacturing a composite construction comprising the steps of:
    (a) forming a core material molding by mixing a mixture of a metal powder that is a metal composition constituting a first hard particle composed of at least one of carbides, nitrides and carbonitrides of metals of Groups 4a, 5a and 6a of the Periodic Table, a binder metal powder, and an organic binder, or a mixture of a metal powder that is a metal composition constituting a first ceramic particle composed of at least one of carbides, nitrides and carbonitrides selected from the group consisting of metals of Groups 4a, 5a and 6a of the Periodic Table, Al, Si and Zn, a sintering additive powder, and an organic binder, and then molding said mixture in a continuous shape;
    (b) forming a composite molding by forming a shell layer molding having a different composition from said molding obtained in the step (a), and disposing said shell layer molding so as to coat the outer periphery of said core material molding obtained in the step (a); and
    (c) sintering said composite molding such that said metal powder of said metal composition constituting said first hard particle or said first ceramic particle is made into ceramic and its volume is expanded, wherein the ratio of the residual free carbon amount $C_{in}$ in the core material to the residual free carbon amount $C_{out}$ in the shell layer, $C_{in}/C_{out}$, is set to the range of 0.5 to 2.

2. The method according to claim 1 wherein said organic binder is added in an amount of 30 to 70% by volume.

3. The method according to claim 1 wherein said composite molding obtained in the step (b) is stretched by co-extrusion.

4. The method according to claim 1 wherein a composite construction having a multi-filament structure is manufactured by binding a plurality of said composite moldings stretched by co-extrusion, and performing co-extrusion again.

5. A method of manufacturing a composite construction comprising the steps of:
    (a) forming a core material molding by mixing a mixture of at least one powder selected from the group consisting of oxides of metals of Groups 4a, 5a and 6a of the Periodic Table, SiO2, ZnO and SnO2, a binder metal powder, and an organic binder, or a mixture of at least one powder selected from the group consisting of oxides of metals of Groups 4a, 5a and 6a of the Periodic Table, SiO2, ZnO and SnO2, a sintering additive powder, and an organic binder, and then molding said mixture in a continuous shape;
    (b) forming a composite molding by forming a shell layer molding having a different composition from said molding obtained in the step (a), and disposing said shell layer molding so as to coat the outer periphery of said core material molding obtained in the step (a); and
    (c) sintering said composite molding,
    wherein at least one powder selected from the group consisting of oxides of metals of Groups 4a, 5a and 6a of the Periodic Table, SiO2, ZnO, and SnO2 is subjected to carbonization or nitriding before sintering or during the time of sintering, and wherein the ratio of the residual free carbon amount $C_{in}$ in the core material to the residual free carbon amount $C_{out}$ in the shell layer, $C_{in}/C_{out}$, is set to the range of 0.5 to 2.

6. The method according to claim 5 wherein said organic binder is added in an amount of 30 to 70% by volume.

7. The method according to claim 5 wherein in the step (c), a heat treatment is carried out at 1000 to 1500° C. for 0.5 to 5 hours in vacuum or inactive atmosphere such that at least one powder selected from the group consisting of oxides of metals of Groups 4a, 5a and 6a of the Periodic Table, SiO2, ZnO and SnO2 is subjected to carbonization or nitriding, followed by sintering at 1300 to 1900° C. for 0.5 to 5 hours in vacuum or inactive atmosphere.

8. The method according to claim 5 wherein in the step (c), at least one powder selected from the group consisting of oxides of metals of Groups 4a, 5a and 6a of the Periodic Table, SiO2, ZnO and SnO2 is carbonized by reacting with the residual of said organic binder used in the step (a).

9. The method according to claim 5 wherein said composite molding obtained in the step (b) is stretched by co-extrusion.

10. The method according to claim 5 wherein said composite molding of multi-filament structure is obtained by binding a plurality of said composite moldings stretched by co-extrusion, and performing co-extrusion again.

11. A method of manufacturing a composite construction comprising the steps of:
    (a) forming a core material molding by mixing a mixture of at least one of carbide powder, nitride powder and carbonitride powder selected from the group consisting of metals of Groups 4a, 5a and 6a of the Periodic Table, Si, Zn and Sn, an iron family metal oxide powder, and an organic binder, or a mixture of at least one powder selected from the group consisting of oxides, carbides, nitrides and carbonitrdides of at least one selected from the group consisting of metals of Groups 4a, 5a and 6a of the Periodic Table, Al, Si and Zn, a sintering additive powder containing an iron family metal oxide powder, and an organic binder, and then molding said mixture in a continuous shape;
    (b) forming a composite molding by forming a shell layer molding having a different composition from said molding obtained in the step (a), and disposing said shell layer molding so as to coat the outer periphery of said core material molding obtained in the step (a); and
    (c) sintering said composite molding,
    wherein said inn family metal oxide powder is subjected to reduction before sintering or during the time of sintering, and wherein the ratio of the residual free carbon amount $C_{in}$ in the core material to the residual free carbon amount $C_{out}$ in the shell layer, $C_{in}/C_{out}$, is set to the range of 0.5 to 2.

12. The method according to claim 11 wherein said organic binder is added in an amount of 30 to 70% by volume.

13. The method according to claim 11 wherein in the step (c), a heat treatment is carried out at 1000 to 1500° C. for 0.5 to 5 hours in vacuum or inactive atmosphere such that said iron family metal oxide powder is subjected to reduction, followed by sintering at 1300 to 1900° C. for 0.5 to 5 hours in vacuum or inactive atmosphere.

14. The method according to claim 11 wherein in the step (c), said iron family metal oxide powder is reacted with residual of said organic binder used in the step (a), to oxidize said residual.

15. The method according to claim 11 wherein said composite molding obtained in the step (b) is stretched by co-extrusion.

16. The method according to claim 11 wherein said composite molding of multi-filament structure is obtained by binding a plurality of said composite moldings stretched by co-extrusion, and performing co-extrusion again.

* * * * *